Nov. 29, 1960

C. M. GRINAGE 2,961,898

MACHINE TOOL PROGRAM SPACING MECHANISM

Filed Aug. 6, 1957

INVENTOR.
CLAUDE M. GRINAGE

BY

ATTORNEY

Nov. 29, 1960 C. M. GRINAGE 2,961,898
MACHINE TOOL PROGRAM SPACING MECHANISM
Filed Aug. 6, 1957 6 Sheets-Sheet 2

INVENTOR.
CLAUDE M. GRINAGE
BY
ATTORNEY

Nov. 29, 1960 — C. M. GRINAGE — 2,961,898
MACHINE TOOL PROGRAM SPACING MECHANISM
Filed Aug. 6, 1957 — 6 Sheets-Sheet 3

FIG. 4

INVENTOR.
CLAUDE M. GRINAGE
BY
ATTORNEY

Nov. 29, 1960    C. M. GRINAGE    2,961,898
MACHINE TOOL PROGRAM SPACING MECHANISM
Filed Aug. 6, 1957    6 Sheets-Sheet 4

INVENTOR.
CLAUDE M. GRINAGE
BY 
ATTORNEY

Nov. 29, 1960  C. M. GRINAGE  2,961,898
MACHINE TOOL PROGRAM SPACING MECHANISM
Filed Aug. 6, 1957  6 Sheets-Sheet 5

INVENTOR.
CLAUDE M. GRINAGE
BY
ATTORNEY

FIG. 9

INVENTOR.
CLAUDE M. GRINAGE
ATTORNEY

United States Patent Office
2,961,898
Patented Nov. 29, 1960

2,961,898

MACHINE TOOL PROGRAM SPACING MECHANISM

Claude M. Grinage, Stratford, Conn., assignor to The Bullard Company, a corporation of Connecticut Filed Aug. 6, 1957, Ser. No. 676,524

3 Claims. (Cl. 77—4)

The present invention relates to machine tools, and particularly to a new and improved spacing mechanism for accurately locating work relatively to a tool-supporting spindle of a machine tool.

Spacing systems of the above-referred to type are generally known in the machine tool art, and they operate on many different principles, a few of which include hydraulic, electronic, magnetic tape, punched card controls as well as others. While many of these systems produce acceptable results, most leave much to be desired regarding maintenance, reliability of components, and cost.

The principal object of this invention is to produce a spacing system that will be relatively inexpensive to manufacture, easy to maintain and which will employ extremely reliable components.

Another object of this invention is to provide a spacing system in which a program of different relative locations between a spindle and a work piece can be effected.

Another object of this invention is to provide a spacing system wherein the locating means includes adjustable motion determining mechanism that is set and checked when the tool and/or work is at the exact desired location in space.

Another object of this invention is to provide a program spacing mechanism in which the various locations to be achieved in the program are successively pre-set with the device to be spaced actually being located at each of the desired locations within the program of operations.

Another object of the invention is to provide a spacing mechanism including apparatus useable with existing components of a machine tool to which it is applied to cause the spaced element always to be moved in the same direction when moving to a predetermined location.

Another object of the invention is to provide a program spacer that is pre-set by manipulation of the machine to which it is applied and determined by the operation of the machine.

Another object of the invention is to provide a method of spacing one element relatively to another element by pre-setting an adjustable dog on a program bar for each position in space, one of the elements is to assume relatively to the other, and checking the location of the pre-set dogs by the actual movement of one of the elements relatively to the other.

One aspect of the invention may be to employ spacing apparatus in combination with a horizontal boring mill or the like, wherein a work-supporting table and a spindle may be accurately located relatively to each other a plurality of times within a cycle of operations. The horizontal boring mill may include a pendant or other control including manually-operated levers for determining the direction of movement of the movable elements in either feed or traverse. The pendant control also may include feed-selecting and spindle-speed-selecting knobs.

Mounting means may be provided on each of the movable members for removably supporting a program bar or rod that may in turn support adjustable dogs which latter may be pre-set along the rod or bar in relation to the desired locations of the movable member. These dogs may cooperate with a compound switch for changing the rate of movement of the movable member from a relatively rapid traverse speed to a relatively slow feeding speed, and thence stopping the movable member.

The circuity of the horizontal boring mill may be modified so that the movable member may be traversed to any predetermined position on the same side of the desired location and then by actuating a single lever the movable member automatically may be moved toward the desired location at traverse speed until it is within a pre-determined short distance, from which it will be moved in the same direction at a slow feeding speed to the desired location where it is stopped.

Means may be provided for checking the accuracy of the pre-setting of the dogs on the program bar, and it may comprise an indicator mounted on the bed of the machine and adapted to cooperate with accurately pre-set gages that move with the movable member. The pre-set program bar may be stored when the job under consideration is finished, and re-used if the demand to use it arises in the future. Means may be provided for bodily adjusting the program bar support so that the first dog thereon can be accurately re-located relatively to a new work piece on the work-supporting member. When this is done, all other dogs will automatically be in the correct position to effect the accurate locating of the work within the cycle of operations.

The above, as well as other objects and novel features of the invention will become apparent from the following specification and accompanying drawings, in which.

Figure 1:
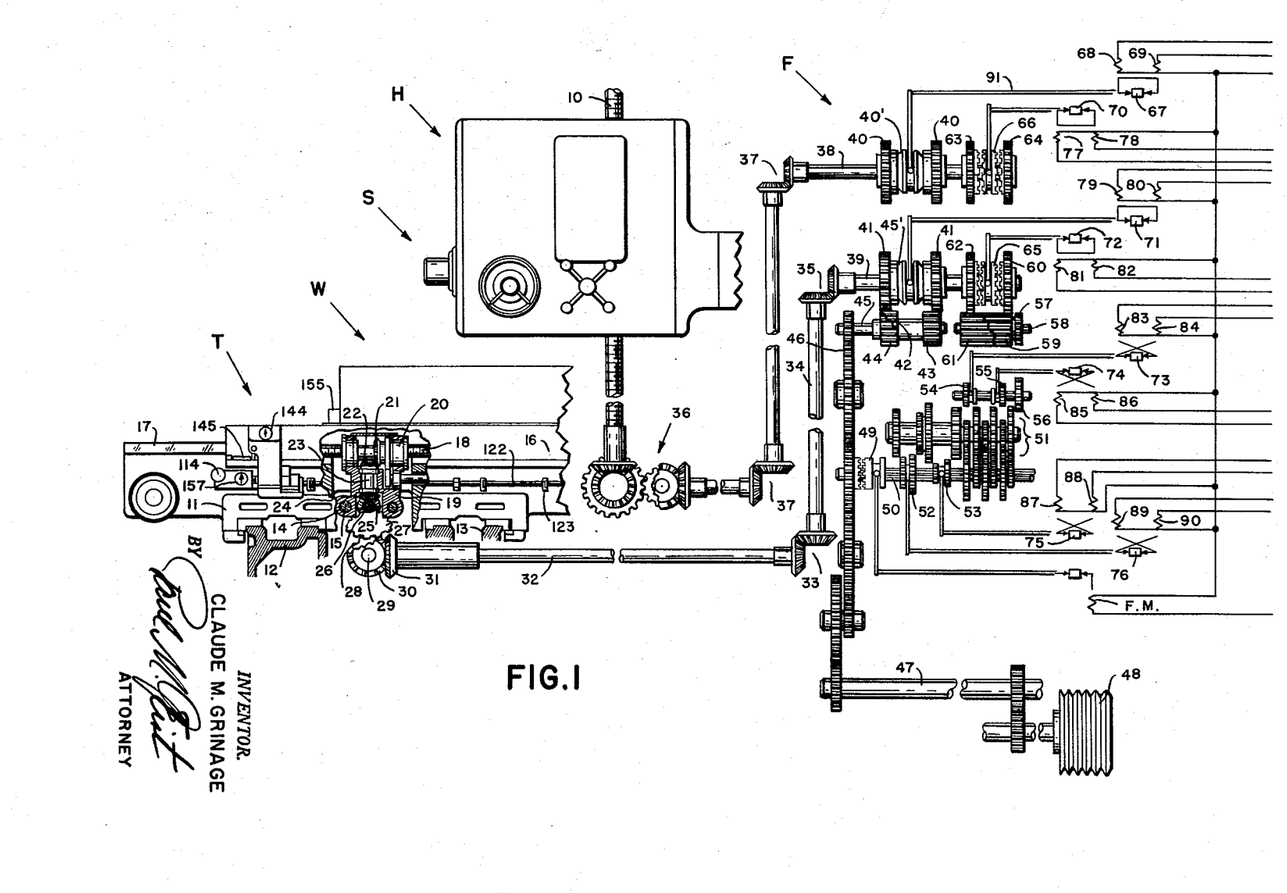
Figure 1 is a sectional schematic diagram of a portion of a horizontal boring mill to which the principles of the invention have been applied.

Referring to the drawings, and particularly to Figure 1, the principles of the invention are shown as applied to a horizontal boring mill. Only those portions of the mill necessary for an understanding of the present invention are shown in the drawings, and will specifically be described. For features of the horizontal boring mill not specifically shown or described attention is directed to application Serial No. 458,110, filed September 24, 1954, now U.S. Patent No. 2,887,906, issued May 26, 1959, in the name of Claude M. Grinage. It may include a head H adapted vertically to be moved by oppositely rotatable screw 10. It may also include a work-supporting table T mounted for universal movement in a horizontal plane. For purposes of clarity the table T is shown in Fig. 1 at 90° from the position it normally assumes in the actual machine. A feedworks transmission F is adapted to effect the vertical movement of the head H and the universal movement of the table T within a horizontal plane at relatively rapid traverse speeds in either direction as well as at any one of a plurality of relatively slow feeding speeds in either direction.

The table T may comprise a saddle 11 that is gibed to parallel ways 12 and 13 integral with the base of the machine. A nut 14 integral with the saddle 11 threadingly engages a screw 15 that extends substantially throughout the length of the machine bed, and the rotation of which screw 15 causes the saddle 11 to be moved along the ways 12 and 13.

A work supporting member 16 is mounted on the saddle 11, and it is adapted to be reciprocated along ways 17 on the saddle 11 and at right angles to the ways 12 and 13 of the machine bed. A non-rotatable axially fixed screw 18 is mounted within a cored opening in the member 16. A stationary housing 19 integral with the nut 14 on saddle 11 may support a nut 20 for rotary movement. The nut 20 threadingly engages the screw 18 and has integrally fixed to it a bevel gear 21 that meshes with a bevel gear 22. The bevel gear 22 is fixed to a vertically disposed shaft 23 journaled in the housing 19, and to the lower end of which shaft 23, another bevel gear 24 is fixed. The bevel gear 24 meshes with a mating bevel gear 25 mounted within housing 19 and splined to a horizontally disposed shaft 26. The shaft 26 has splined to it a spur gear 27 rotatably mounted in bearings within the base and in mesh with a corresponding spur gear 28 fixed to a saft 29 mounted in the bed of the machine. A bevel gear 30 fixed to the shaft 29 meshes with a corresponding bevel gear 31 that is fixed to a shaft 32. From the foregoing it is evident that the rotation of the shaft 32 in opoiste directions will cause opposite directional rotation of the rotatable nut 20 thereby effecting the movement of the work-supporting member 16 along the ways 17 in both directions. The shaft 32 is adapted to be driven in either direction of rotation at any one of a plurality of speeds through bevel gearing 33 shafting 34 and bevel gearing 35 which latter leads into the feed works transmission F.

The head H is adapted vertically to be reciprocated along a column of the machine (not shown) by the rotation of the screw 10 which cooperates with a nut mechanism (not shown) within the head H. The screw 10 is adapted to be rotated in a forward and reverse direction through gearing and shafting generally designated 36 which is driven from the feed works transmission F through bevel gearing and shafting generally indicated at 37.

The feed works transmission F may comprise shafts 38 and 39 on which reversible gearing 40 and 41 is mounted. The gears of gearing 40 and 41 normally intermesh, but for purposes of clarity are shown separated in Fig. 1. Gears 42 and 43 mesh with separate gears of the gearing 41. Gear 42 is an idle gear between a gear 44 and one of the gears of gearing 41. The gear 44 as well as gear 43 are mounted on a common drive shaft 45. Accordingly, rotation of shaft 45 causes the gears of gearing 41 to rotate reversely, and shifting of clutch 45', therefore, effects the reverse rotation of shaft 39. Since gearing 40 meshes with gearing 41, shifting of clutch 40' effects the reverse rotation of shaft 38. A spur gear 46 is keyed to shaft 45 and meshes with a gear train leading to a shaft 47 that is driven through a V-belt pulley 48 and a source of power (not shown). The gearing 40 and 41 is adapted to move the head H and the work-supporting member 16 in both directions of travel at a relatively rapid traverse speed. In order to provide relatively slow feed rates of speed of the head H and the work supporting member 16, a clutch 49 is adapted to be shifted into and out of engagement with one of the gears of the train between shaft 47 and shaft 45. The clutch 49 is splined to a shaft 50 that forms one shaft of a speed reduction unit 51. The unit 51 includes gear-shifting clusters 52, 53, 54 and 55. The output of the speed reduction gearing 51 includes a spur gear 56 that meshes with a corresponding spur gear 57 (in the drawing these gears are shown separated for clarity). The gear 57 is fixed to a shaft 58 on which is mounted a gear 59 that meshes with a gear 60 journaled on the shaft 39. An idler gear 61 meshes with the gear 59 and in turn meshes with a gear 62 journaled on the shaft 39. Accordingly, rotation of the shaft 58 causes reverse rotation of the gears 60 and 62 which latter mesh respectively with gears 63 and 64 journaled on the shaft 38. The shifting of clutches 65 and 66 is adapted to cause reverse rotation of the shafts 38 and 39 at the rate of speed that is determined by the positions of the gear clusters 52, 53, 54 and 55 of the speed reduction unit 51. The feed works transmission F as outlined above is substantially identical with that shown in the above mentioned Patent No. 2,887,906, in the name of Claude M. Grinage, on Horizontal Boring Mill, to which patent reference is directed for specific features of construction.

The clutch 40' is connected to a solenoid operated piston mechanism 67 having solenoid valves 68 and 69 for controlling the shifting of the clutch 40'. The clutch 66 is connected to a solenoid operated piston mechanism 70; clutch 45' is connected to a solenoid operated piston mechanism 71; clutch 65 is connected to a solenoid operated piston mechanism 72 and the gear clusters 54, 55, 53 and 52 are, respectively, connected to solenoid operated piston mechanism 73, 74, 75 and 76. Solenoid operated valves 77 and 78 are adapted to actuate the piston mechanism 70; solenoid operated valves 79 and 80 control piston mechanism 71; solenoid operated valves 81 and 82 control piston mechanism 72; solenoid valves 83 and 84 control piston mechanism 73; solenoid valves 85 and 86 control piston mechanism 74; solenoid valves 87 and 88 control piston mechanism 75; and, solenoid valves 89 and 90 control piston mechanism 76.

Figure 2:
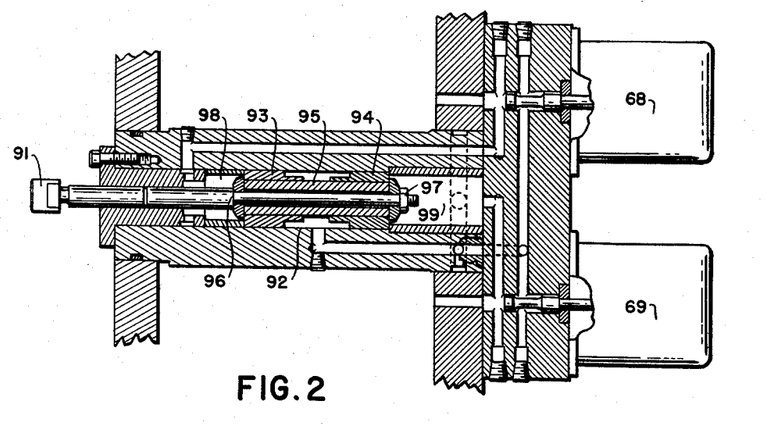
Fig. 2 is a sectional view through one of the solenoid operated valve mechanisms for shifting the clutches in the transmission shown in Fig. 1.

All of the solenoid operated valve mechanisms for operating their respective piston mechanisms are substantially identical with that shown in Fig. 2, and may comprise a rod 91 that extends into a cylinder 92 within which is mounted separately operated piston devices 93 and 94 slidingly mounted on a tubular sleeve member 95 that is rigidly held to the rod 91 between the shoulder 96 and the nut 97. Introduction of fluid under pressure to the cylinder 92 separates the pistons 93 and 94 and thereby neutralizes the clutch 40'. Introduction of fluid under pressure into chamber 98 causes clutch 40' to move rightwardly (Fig. 1); and, introduction of fluid into a chamber 99 effects movement of clutch 40' leftwardly, all as more fully described in the above-identified application.

Figure 4:
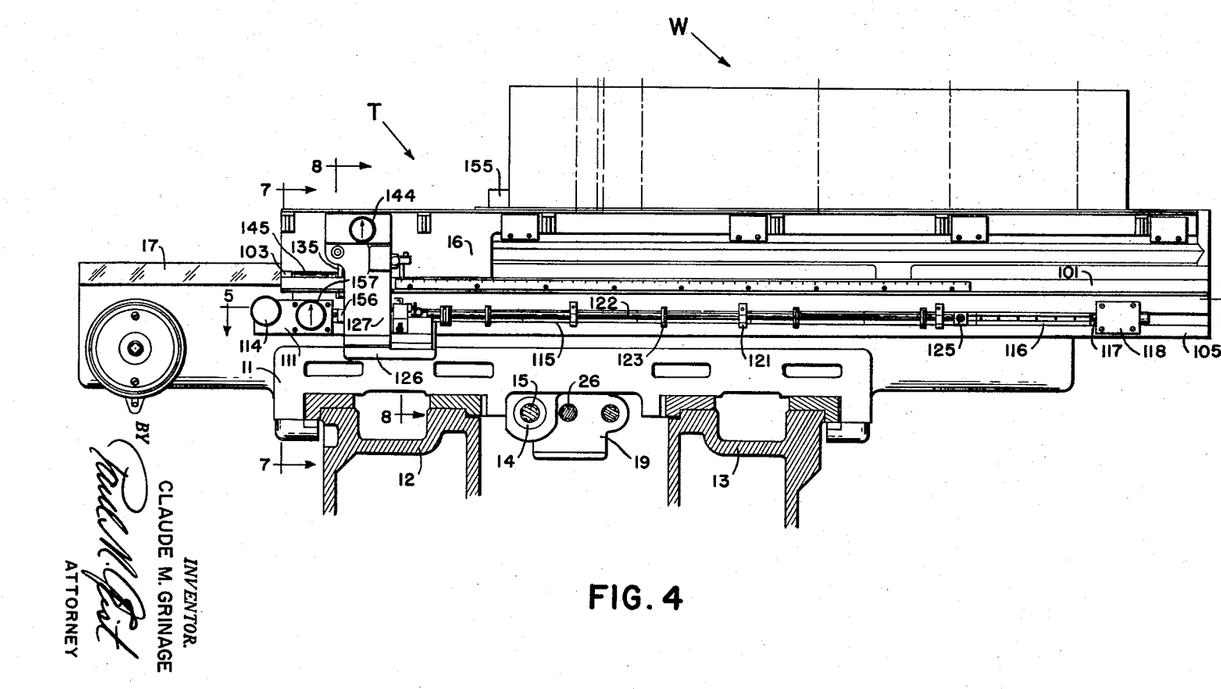
Fig. 4 is a front elevational view of a portion of the apparatus shown in Fig. 1 in an enlarged form.
Figure 7:
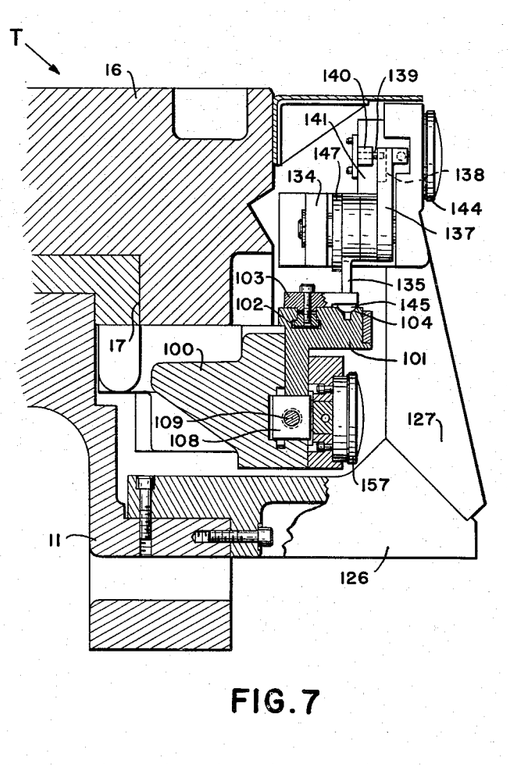
Fig. 7 is a sectional elevational view taken substantially along line 7—7 of Fig. 4.
Figure 8:
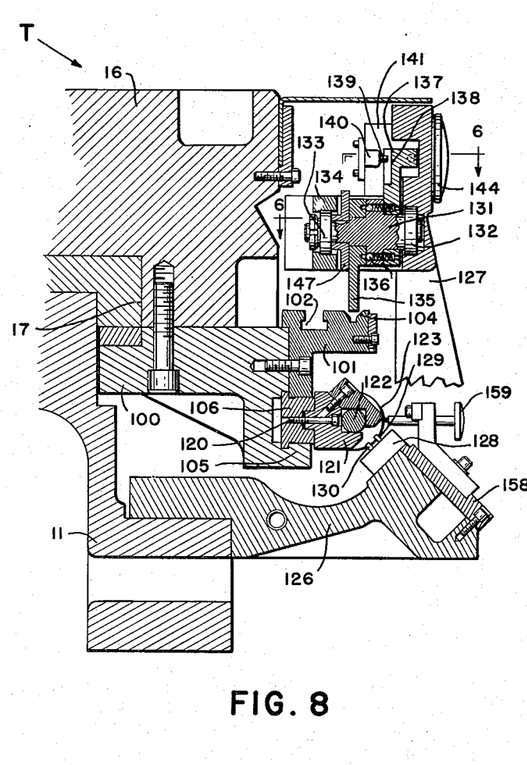
Fig. 8 is a sectional elevational view taken substantially along line 8—8 of Fig. 4.

Referring to Figs. 4 and 8, and particularly to Fig. 8, the table 16 has bolted to it a bracket 100 that may extend substantially throughout its length, and to which is fixed an auxiliary bracket 101 that also may extend substantially throughout the length of the table 16. The auxiliary bracket 101 includes a trough 102 for adjustably supporting an abutment bar 103 (Fig. 7) for a purpose to be described later. Bracket 101 also includes a trough 104 parallel with trough 102 and adapted to support in aligned relation, pin gages 145 for pre-setting the program of a cycle of spacing operations to be performed.

The auxiliary bracket 101 may form with a grooved arm 105 of bracket 100, a guide bearing for a slidable bar 106 that is adapted manually to be moved along a path parallel with the troughs 102 and 104. The bar 106 may be provided with a recess 107 (Fig. 5) formed by a nut 108 fixed to the one end thereof. A threaded stud 109 may be threaded into the nut 108 and it may be journaled in a bearing 110 within a bracket 111 that is attached to the table 16 through the bracket 100. A worm gear (not shown) fixed to stud 109 meshes with a worm 112 on a shaft 113 journaled in bracket 111 at right angles to stud 109. A handwheel 114 may be fixed to shaft 113 so that manual rotation in both directions thereof will effect reciprocation of the bar 106.

Figure 5:
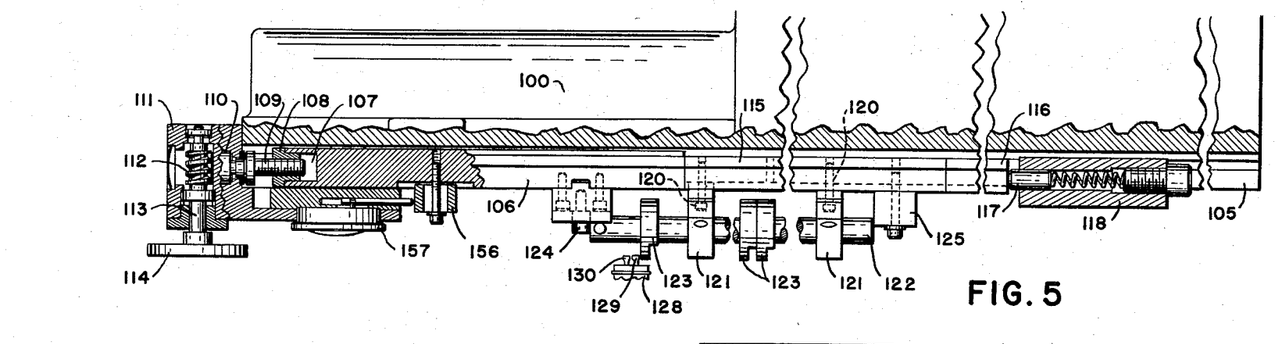
Fig. 5 is a view partly in section taken substantially along line 5—5 of Fig. 4.

Axially aligned and reciprocable within the slide bearing formed by the grooved arm 105 and bracket 101 (Fig. 8) are separate extensions 115 and 116 of bar 106 (Fig. 5). There may be any number of these extensions and they are all normally urged into abutting relationship with each other by a spring pressed plunger 117 mounted in a cylinder formed within a bracket 118 that is fixed to the table 16 through bracket 100. Each of the extensions 115, 116 may be provided with equally spaced threaded holes for receiving cap screws 120 (Fig. 8) which latter may hold clamp portions 121 to the extensions 115 and 116. A rod 122 having adjustable dogs 123 mounted thereon may be held by clamp portions 121 in fixed relation between an abutment 124 fixed to bar 106 and an adjustable abutment 125 fixed to one of the extensions 115 or 116.

Referring to Fig. 8, a bracket 126, fixed to saddle 11, includes a vertically extending arm 127. A switch block 128 is mounted on bracket 126, and it includes two switches 129 and 130, respectively shown in Fig. 9 at lines 60 and 62. The switches 129 and 130 are adapted to be operated successively by the dogs 123 as the table 16 moves toward the spindle within head H.

In order to accurately locate the dogs 123 on the rod 122 in relation to the switches 129 and 130, as well as in relation to a desired point on a work piece W mounted on the table 16, a checking and setting mechanism is mounted on arm 127 which cooperates with pin gages within the trough 104. It comprises an oscillatable stud shaft 131 having bearings 132 and 133 journaled in aligned recesses within arm 127 and an auxiliary arm 134 integral with arm 127.

Figure 6:
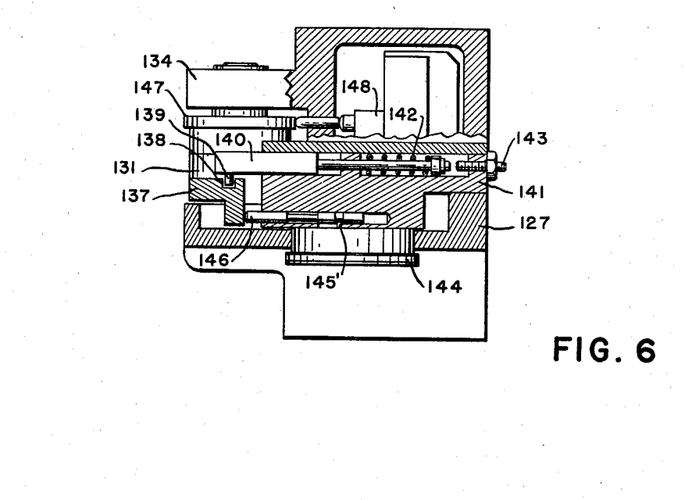
Fig. 6 is a sectional plan view taken substantially along line 6—6 of Fig. 8.

A depending finger 135 is journaled on stud shaft 131 and normally held against rotation relatively to shaft 131 by spring pressed balls 136. An arm 137, fixed to shaft 131 extends therefrom at 180° from finger 135. Referring to Fig. 6, arm 137 is provided with a slot 138 that receives a pin 139 on a reciprocable link 140 mounted in a member 141 that is fixed to the arm 127. A spring 142 normally urges the link 140 rightwardly (Fig. 6) and an adjusting screw 143 limits the rightward movement thereof.

A gage 144 is mounted in the arm 127 and its actuating pin 145' engages a reciprocable pin 146 that abuts against the top of arm 137. From the foregoing it is evident that movement of the lower end of finger 135 is registered on the gage 144 in a 1:1 relation as shown in the embodiment disclosed.

Accordingly, with the bar 103 (Fig. 7) adjusted along trough 102, and with or without a pin gage 145 in trough 104 between bar 103 and the lower end of finger 135, movement of table 16 away from head H will cause a dog 123 to operate switches 129 and 130 to slow down and stop the movement of table 16, as will be described later. Should the table 16 for any reason continue to move away from the head H, the finger 135 will be released by the spring balls 136 and turn about the axis of the shaft 131. This turning will cause a cam 147 (Fig. 6) to actuate a switch 148, line 24 of Fig. 9 to stop the movement of table 16.

Figure 9:
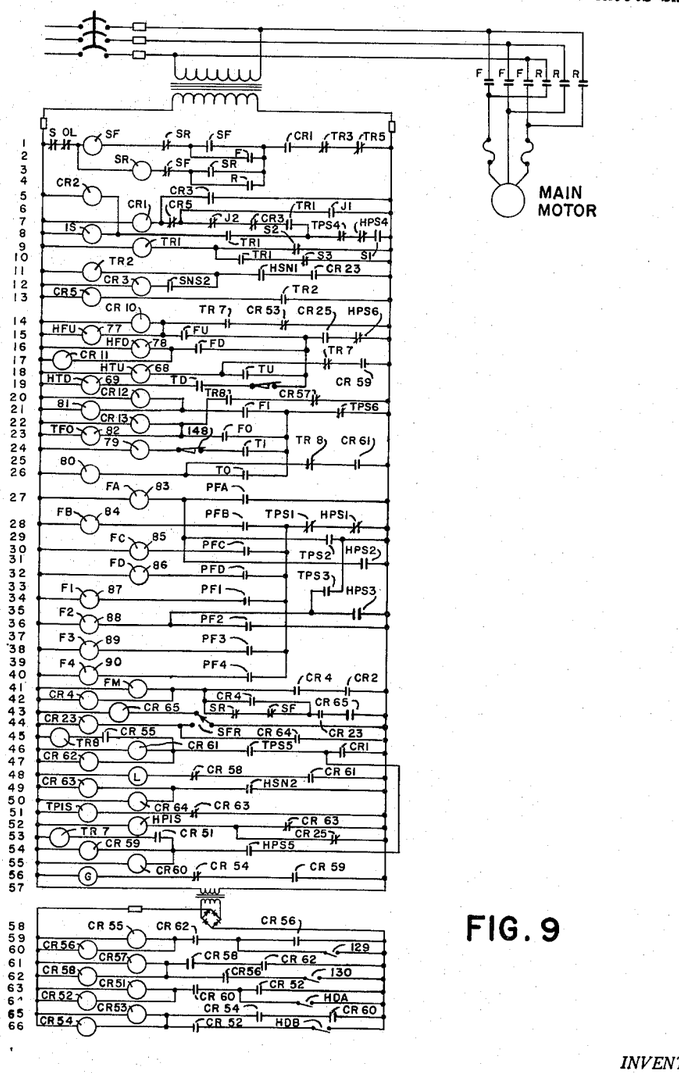
Fig. 9 is an electrical wiring diagram for the machine shown in Figs. 1 to 8.

Fig. 9 is a wiring circuit of the machine to which the principles of the present invention have been applied. In Fig. 9, the numerals along the edges are employed to locate the various electrical components referred to in the text, and will appear within parentheses in the following.

Figure 3:
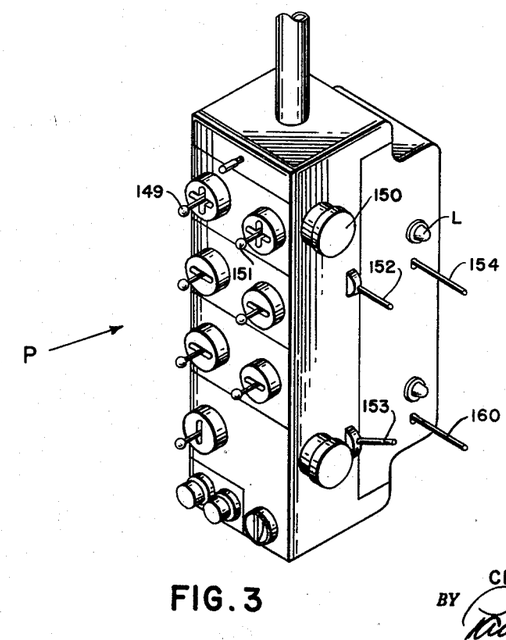
Fig. 3 is a perspective view of a pendant control mechanism for controlling the operation of the transmission shown in Fig. 1.

Referring to Fig. 3, a hand lever 149 can be moved horizontally in two directions and vertically in two directions from a central neutral location. Movement of the lever 149 leftwardly is adapted to close a switch (Fig. 9) FI (21) to thereby energize solenoid valve coil 81 (21) thereby causing table 16 to move rearwardly toward head H at a rate depending upon the setting of a feed dial 150 on the pendant P Fig. 3. Likewise movement of a lever 151 leftwardly closes a switch T1 (24) thereby energizing solenoid valve coil 79 (24) which causes the table 16 to move rearwardly toward the head H at a rapid traverse rate. Additionally, movement of the lever 151 rightwardly closes switch T0 (26) thereby energizing coil 80 (26) which causes the table 16 to move forwardly away from the head H at a rapid traverse rate.

With the pendant switch levers 152 and 153 in the position shown in Fig. 3, where switch lever 153 is in its upper position and switch lever 152 is in its lower position, normally open contacts HSN1 (11) and HSN2 (49) are closed by lever 153, and normally open SNS2 contact (12) is closed by lever 152. Closing HSN2 contact (49) energizes CR63 coil (49) and CR64 coil (50). Energization of CR63 coil (49) opens normally closed CR63 contact (51) to thereby de-energize TP1S coil (51).

Energization of CR64 coil (50) closes normally open CR64 contact (45), thereby energizing CR23 coil (44), which effects closing of CR23 contacts (11 and 43). Closing of CR23 contact (43), energizes the FM solenoid and CR4 relay (41, 42) since contact CR65 has been closed by the energization of the CR65 relay (43). Energizing the FM solenoid (41) (Fig. 1) engages clutch 49 prior to the energization of the main motor. Since HSN1 contact (11) and SNS2 contact (12) are closed as above described, coil CR3 (12) is energized. Energization of CR3 (12) closes CR3 contact (5), thereby energizing CR1 coil (7), which in turn closes CR1 contact (1), and since contact F (2) has been manually closed, the coil SF (1) will be energized. Energization of SF coil (1) closes F contacts of the main motor, causing the main motor to rotate in the forward direction. Reverse rotation of motor must not be employed when spacing is desired.

With the main motor running in a forward direction, the apparatus is in condition to effect spacing of the table 16, and this in initiated by holding down a lever 154 on the pendant P (Fig. 3).

This lever must be held down during the entire spacing operation and when the table 16 has finally stopped, it is released thereby conditioning the contacts associated with it for the next succeeding spacing operation. Movement of lever 154 downwardly opens normally closed contacts TPS1 (28), TPS4, (8) and TPS6 (21); and, closes normally open TPS2 (29), TPS3, (33) and TPS5 (46) contacts. Closing the TPS2 contact (29) energizes the FA solenoid 83 (27). Closing the TPS3 contact (33) energizes the F2 solenoid 88 (36). Closing the TPS5 contact (46) energizes the CR61 and CR62 relays (46 and 47) since the CR1 contact (46) is closed due to the CR1 relay (7) being energized. Energizing CR61 relay (46) closes CR61 contact (25) thereby energizing solenoid coil 80 (26) causing the table 16 to traverse outwardly away from the spindle S. Closing CR61 contact (48) energizes a light relay L (48) which indicates that the positioning mechanism is active. As previously described at the beginning, normally open HSN2 contact (49) is closed by lever 153 on the pendant P being in its lower position. Accordingly, relays CR63 and CR64 (49 and 50) are energized. Energizing the CR63 relay (49) opens normally closed contacts CR63 (51 and 52) thereby de-energizing the relays TP1S and HP1S (51 and 52) which releases the table 16 and head H positioning interlocking solenoids permitting movement of the table 16 and head H.

Opening TPS1 contact (28) prevents the energization of the FB, FC, FD, F1, F3 and F4 solenoids (28, 30, 32, 34, 38 and 40) in the event their corresponding pendant contacts are manually actuated. Opening TPS4 contact (8) prevents energizing the IS solenoid (8) and the CR2 relay (5) when the jog lever on the pendant is actuated. Finally, opening the TPS6 contact (21) prevents energizing the 81, TF0, 79 and 80 solenoids (21, 23, 24 and 26) in the event their corresponding pendant contacts are actuated.

The outward movement of the table T in traverse due to the energization of 80 solenoid (26) continues until a dog 123 (Fig. 5) contacts the switch 129 (60), energizing CR55 and CR56 relays (59 and 60) since CR62 contact (59) is closed due to the previous energization of the CR62 relay (47). Energizing CR55 relay (59) closes CR55 contact (45) thereby energizing the TR8 relay (45). Energization of the TR8 relay opens the TR8 contact (25) and closes the TR8 contact (20). Opening the TR8 contact (25) de-energizes the 80 solenoid (26) and closing the TR8 contact (20) energizes the 82 solenoid (23). Accordingly, the table changes from a "traverse out" speed to a "feed out" speed at the rate established by the energization of the FA and F2 solenoids (27 and 36) as previously described.

The table T continues its out feed movement until the switch 130 (62) is closed. Closing switch 130 energizes CR57 and CR58 relays (61 and 62) since contact CR56 (62) is still closed due to the continued energization of relay 56 (60).

Energizing CR58 relay closes CR58 contact (61) to hold the circuit should switch 130 open after closing. Energizing CR58 relay (62) also opens CR58 contact (48) whereupon the light L is extinguished.

Energizing CR57 relay (61) opens CR57 contact (20) thereby de-energizing the 82 solenoid (23) causing the Table T to stop. As previously described, lever 154 has been held down during the entire spacing operation and after table 16 has stopped as indicated by light L (48) being extinguished, it is released whereupon it returns to its original position which re-conditions the contacts associated with it for a next succeeding spacing operation.

In order to understand more fully the principles of the present invention, it is believed that a description of the manner in which the apparatus is set up for a cycle of spacing operations will be helpful.

Referring to Fig. 4, one or more locating strips 155 may be rigidly fixed to table 16, and the work W may be fixed to the table abutting said strips. This will establish the location of each succeeding work piece relatively to the table 16. By manually operating the levers 149 and 151, the table 16 and work W can be brought to the correct position relatively to the spindle S for performing the first operation on the work W by a tool in the spindle S.

Any pin micrometer may be placed in trough 104 (Fig. 7), and arm 103 may be adjusted along trough 102 until a reading appears on dial 144. Dial 144 is then set to zero. This initial setting then represents the datum position of table 16 and workpiece W for the first operation of the cycle.

The bar 122 is then provided with dogs 123 equal to the number of spacing operations to be effected within the cycle of operations, and these dogs 123 are spaced apart on bar 122 the correct location for the various operations to be performed. This may be done roughly with a scale and a print of the work to be accomplished, or more accurately by "Jo blocks" or the like.

The bar 122 is fixedly located in its proper place by clamps 121, and a dog 156 (Fig. 5) on bar 106 is adjusted so that a reading appears on a gage 157 fixed to the bracket 111 (Fig. 5). The gage 157 is then adjusted to read zero. Operation of the spacing mechanism is rendered effective by holding lever 154 down (Fig. 3) until the first dog 123 on bar 122 actuates switch 130 to cause stopping of the table 16. Any reading now appearing on gage 144 will represent the error, if any, of the location of the first dog 123 on the bar 122.

There are two ways of adjusting the location in space of the first dog 123 on the bar 122, but only one for adjusting the remaining dogs 123 on bar 122. Since gage 157 still reads zero (not having been changed since dog 156 was adjusted in setting it to zero), handwheel 114 may be turned in the correct direction until gage 157 reads an amount equal to the error appearing on gage 144. Then by manually retracting table 16 and repeating the spacing operation by holding lever 154 (Fig. 3) down, the table 16 should stop with gage 144 reading zero. When this occurs, gage 157 is again set to zero where it must remain throughout the cycle of spacing operations in relation to the remaining dogs 123 on bar 122.

Referring to Fig. 8, the bracket 126 is adapted to support a guiding plate 158 along which an indicator 159 is adapted adjustable to be located. Accordingly, an alternative method of correcting the error appearing on gage 144 after the table 16 has stopped by the action of the first dog operating switch 130 would be to set the indicator 159 to zero while in contact with the first dog 123, and then to adjust the indicator to read the error appearing on gage 144. Then, by loosening the first dog 123 and tapping it until the indicator 159 reads zero, the error appearing on gage 144 will have been overcome.

In order to accurately set the second dog 123 on bar 122, the table 16 is moved in a direction to permit a new combination of pin micrometers to be located in the trough 104 between bar 103 and finger 135 which will exactly equal the space between the first and second operations to be performed on the work W. The table 16 is then caused to move holding lever 154 (Fig. 3) down until the spacing cycle has been completed by the second dog 123 on bar 122 actuating switch 130 as previously explained. Any error in the pre-setting of the second dog 123 will appear on gage 144.

This error can only be corrected by employing the alternative tapping method of adjusting the second dog 123 in conjunction with the indicator 159. The accurate setting of the remaining dogs 123 on bar 122 is accomplished in the same manner as described in connection with the setting of the second dog.

When the production run, corresponding to the pre-set bar 122, has been completed, the bar with the adjusted dogs 123 thereon may be stored until a repeat order is needed. To re-set the machine, the pre-set bar 122 may be attached to table 16 by clamps 121 in the usual manner, a work piece W fastened to the table, and spindle S brought into the correct position for operation number one by manipulating levers 149 and 151 (Fig. 3) as previously described. A zero or datum setting pin micrometer, may then be located in the trough 104 between bar 103 and finger 135, and bar 103 adjusted until a reading appears on gage 144. Gage 144 is then set to zero, and the table 16 is caused to space by holding lever 154 down (Fig. 3) until the first dog 123 on bar 122 stops the table 16 by actuating switch 130. Any reading on the dial of gage 144 represents the error of the entire bar 122. The gage 157 is then set to read zero and then adjusted to read the error appearing on gage 144. Accordingly, by turning handwheel 114 in the correct direction until the gage 157 reads zero again, the entire bar 122 is moved a corresponding distance correcting the error of the first dog 123 on bar 122. Since all remaining dogs 123 have remained in fixed position on bar 122, they automatically are correctly set for the cycle of spacing operations.

An identical spacing mechanism may be applied to the head H and it would be controlled by a lever 160 and the movement of levers 149 and 151 in a vertical plane (Fig. 3) in the same way that the spacing mechanism for table 16 is controlled by lever 154 and the movement of levers 149 and 151 in a horizontal plane.

Although the principles of the new and improved spacing mechanism have been shown and described in detail to fully disclose one embodiment of the invention, it will be evident that numerous changes may be made in such details and certain features may be used without others without departing from the principles of the invention.

I claim:
1. Apparatus comprising in combination, a base; a member mounted on said base and adapted to be moved along a rectilinear path at a relatively rapid traverse speed and a relatively slow feed speed; adjustable means for establishing a datum for said member relatively to said base; a program bar; clamp supporting means mounted in a trough extending longitudinally along said member; clamp means adapted releasably to hold said program bar on said clamp supporting means; adjustable elements adapted to be pre-set on said program bar in position representing successive locations to which said member is to be located along its path of movement; means for establishing a relationship between said bar and said member; a pair of switches mounted on said base and adapted successively to be operated by an element on said bar for the location represented by said element; means for initiating the movement of said member along said path at said rapid traverse speed; means responsive to an element contacting said switches for successively changing said traverse speed to said feed speed and said feed speed to stop; and means adapted to cooperate with said datum establishing means for checking the accuracy of the pre-set condition of the elements on said program bar, the construction and arrangement of the parts being such that the program bar may be removed and replaced from time to time and adjusted by said program bar adjusting means to establish the correct relationship between the first element on said bar and said member with the correct relationship between all other elements on said bar and said member being automatically established.

2. Apparatus comprising in combination, a base; a member mounted on said base and adapted to be moved along a rectilinear path at a relatively rapid traverse speed and a relatively slow feed speed; adjustable means for establishing a datum for said member relatively to said base; a program bar; a plurality of aligned clamp supporting means mounted in a trough extending longitudinally along said member; clamp means adapted releasably to hold said program bar on said clamp supporting means; adjustable elements adapted to be pre-set on said program bar in position representing successive locations to which said member is to be located along its path of movement; means for establishing a relationship between said bar and said member; a pair of switches mounted on said base and adapted successively to be operated by an element on said bar for the location represented by said element; means for initiating the movement of said member along said path at said rapid traverse speed; means responsive to an element contacting said switches for successively changing said traverse speed to said feed speed and said feed speed to stop; and means adapted to cooperate with said datum establishing means for checking the accuracy of the pre-set condition of the elements on said program bar, the construction and arrangement of the parts being such that the program bar may be removed and replaced from time to time and adjusted by said program bar adjusting means to establish the correct relationship between the first element on said bar and said member with the correct relationship between all other elements on said bar and said member being automatically established.

3. Apparatus comprising in combination, a base; a member mounted on said base and adapted to be moved along a rectilinear path at a relatively rapid traverse speed and a relatively slow feed speed; adjustable means for establishing a datum for said member relatively to said base; a program bar; a plurality of aligned clamp supporting means mounted in a trough extending longitudinally along said member; resilient means for maintaining said aligned means in abutting relation; clamp means adapted releasably to hold said program bar on said aligned means; adjustable elements adapted to be pre-set on said program bar in position representing successive locations to which said member is to be located along its path of movement; means for establishing a relationship between said bar and said member; a pair of switches mounted on said base and adapted successively to be operated by an element on said bar for the location represented by said element; means for initiating the movement of said member along said path at said rapid traverse speed; means responsive to an element contacting said switches for successively changing said traverse speed to said feed speed and said feed speed to stop; and means adapted to cooperate with said datum establishing means for checking the accuracy of the pre-set condition of the elements on said program bar, the construction and arrangement of the parts being such that the program bar may be removed and replaced from time to time and adjusted by said program bar adjusting means to establish the correct relationship between the first element on said bar and said member with the correct relationship between all other elements on said bar and said member being automatically established.

References Cited in the file of this patent

UNITED STATES PATENTS

| | | |
|---|---|---|
| 2,143,255 | Abe | Jan. 10, 1939 |
| 2,632,353 | Montanus et al. | Mar. 24, 1953 |
| 2,648,237 | Falconi | Aug. 11, 1953 |
| 2,692,518 | Armitage | Oct. 26, 1954 |
| 2,722,853 | Knosp et al. | Nov. 8, 1955 |
| 2,757,579 | Stephan | Aug. 7, 1956 |
| 2,812,580 | Masinda | Nov. 12, 1957 |
| 2,840,956 | Grinage | July 1, 1958 |

FOREIGN PATENTS

| | | |
|---|---|---|
| 1,112,168 | France | Nov. 9, 1955 |